US012014865B2

(12) United States Patent
Okuizumi et al.

(10) Patent No.: US 12,014,865 B2
(45) Date of Patent: Jun. 18, 2024

(54) INDUCTOR AND METHOD FOR MANUFACTURING THE SAME

(71) Applicant: Murata Manufacturing Co., Ltd., Kyoto-fu (JP)

(72) Inventors: Hiroshi Okuizumi, Nagaokakyo (JP); Kozo Sato, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 722 days.

(21) Appl. No.: 17/033,536

(22) Filed: Sep. 25, 2020

(65) Prior Publication Data

US 2021/0098184 A1 Apr. 1, 2021

(30) Foreign Application Priority Data

Sep. 26, 2019 (JP) ................................ 2019-175758
Jun. 22, 2020 (JP) ................................ 2020-107014

(51) Int. Cl.
*H01F 5/00* (2006.01)
*H01F 27/255* (2006.01)
*H01F 27/28* (2006.01)
*H01F 27/29* (2006.01)
*H01F 41/02* (2006.01)
*H01F 41/063* (2016.01)

(52) U.S. Cl.
CPC ........... *H01F 27/29* (2013.01); *H01F 27/255* (2013.01); *H01F 27/2823* (2013.01); *H01F 41/0246* (2013.01); *H01F 41/063* (2016.01)

(58) Field of Classification Search
CPC .................................................. H01F 27/2823
USPC ................................................ 336/192, 200
See application file for complete search history.

(56) References Cited

U.S. PATENT DOCUMENTS

2015/0325364 A1 11/2015 Lee et al.
2016/0086725 A1* 3/2016 Igarashi ............. H01F 27/2823 336/83
2019/0244745 A1* 8/2019 Kojima ................ H01F 27/255
2019/0295760 A1* 9/2019 Xia .................... H01F 41/0206
(Continued)

FOREIGN PATENT DOCUMENTS

JP 2010-177492 A 8/2010
JP 2010-245473 A 10/2010
JP 4961441 B2 6/2012
(Continued)

*Primary Examiner* — Ronald Hinson
(74) *Attorney, Agent, or Firm* — Studebaker & Brackett PC

(57) ABSTRACT

An inductor includes a body including a magnetic portion and a coil embedded in the magnetic portion and outer electrodes. The coil includes a wound portion formed by winding a conductive wire having a pair of wide surfaces in upper and lower layers and first and second lead-out portions extending from end portions of the wound portion at outermost peripheries of the upper and lower layers. One wide surface of a distal end portion of the first lead-out portion is exposed at a mounting surface of the body, a first surface adjacent to the mounting surface, and a corner portion therebetween. One wide surface of a distal end portion of the second lead-out portion is exposed at the mounting surface, a second surface adjacent to the mounting surface, and a corner portion therebetween. The outer electrodes cover the exposed wide surfaces of the first and second lead-out portions.

3 Claims, 12 Drawing Sheets

(56) References Cited

U.S. PATENT DOCUMENTS

2021/0005379 A1* 1/2021 Yeo ......................... H01F 27/02

FOREIGN PATENT DOCUMENTS

| | | | |
|---|---|---|---|
| JP | 2013-149814 | A | 8/2013 |
| JP | 2013-183052 | A | 9/2013 |
| JP | 2015-220272 | A | 12/2015 |
| JP | 2017-011042 | A | 1/2017 |
| JP | 2017-120809 | A | 7/2017 |
| JP | 2018-182206 | A | 11/2018 |
| JP | 2019-125689 | A | 7/2019 |
| JP | 2019-197781 | A | 11/2019 |

* cited by examiner

INDUCTOR AND METHOD FOR MANUFACTURING THE SAME

CROSS-REFERENCE TO RELATED APPLICATION

This application claims benefit of priority to Japanese Patent Application No. 2019-175758, filed Sep. 26, 2019, and to Japanese Patent Application No. 2020-107014, filed Jun. 22, 2020, the entire contents of each are incorporated herein by reference.

BACKGROUND

Technical Field

The present disclosure relates to an inductor and a method for manufacturing the inductor.

Background Art

In recent years, various types of inductors for various uses have been developed. For example, United States Patent Application Publication No. 2015/0325364 describes an inductor for general use including a body, which includes a coil and a magnetic portion that covers the coil, and external terminals disposed on a mounting surface of the body. End portions of the coil extend to the mounting surface, and are connected to outer electrodes made of a conductive resin containing metal particles and a resin.

When such an inductor is used as a car-mounted inductor, each outer electrode is required to be L-shaped and extend along the mounting surface and a side surface of the body.

When each outer electrode of the inductor described in United States Patent Application Publication No. 2015/0325364 is L-shaped, a portion of the outer electrode on the mounting surface of the body is fixed to both an end portion of the coil and the body, and a portion of the outer electrode on a side surface of the body is fixed only to the body. According to such an inductor, the metal particles contained in the outer electrode can be joined to the end portion of the coil, so that the end portion of the coil serves to increase the connection reliability between the portion of the outer electrode on the mounting surface of the body and the body. However, according to the inductor, the portion of the outer electrode on the side surface of the body is fixed only to the body by the resin contained in the outer electrode. Therefore, when the resin contained in the outer electrode is degraded, the connection reliability between the outer electrode and the side surface of the body is reduced. Accordingly, when the inductor according to the related art receives a force after being soldered onto a substrate, the portion of the outer electrode on the side surface of the body is easily removed. Thus, the joining strength between the inductor and the substrate is not sufficient.

SUMMARY

Accordingly, the present disclosure provides an inductor with improved connection reliability between a body and outer electrodes and a method for manufacturing the inductor.

An inductor according to an aspect of the present disclosure includes a body and a pair of outer electrodes. The body is externally rectangular parallelepiped-shaped and includes a magnetic portion containing magnetic powder and a coil embedded in the magnetic portion. The pair of outer electrodes are provided on the body and connected to the coil. The coil includes a wound portion formed by winding a conductive wire in an upper layer and a lower layer, the conductive wire having a pair of wide surfaces that are opposite to each other, and a pair of lead-out portions, one of which extends from one end portion of the wound portion positioned at an outermost periphery of the upper layer and other of which extends from other end portion of the wound portion positioned at an outermost periphery of the lower layer. The pair of lead-out portions include a first lead-out portion and a second lead-out portion. One wide surface of a distal end portion of the first lead-out portion is exposed at a mounting surface of the body, a first surface of the body that is adjacent to the mounting surface, and a corner portion between the mounting surface and the first surface. One wide surface of a distal end portion of the second lead-out portion is exposed at the mounting surface of the body, a second surface of the body that is adjacent to the mounting surface, and a corner portion between the mounting surface and the second surface. The pair of outer electrodes cover the wide surface of the first lead-out portion and the wide surface of the second lead-out portion that are exposed at the surfaces of the body.

A method for manufacturing an inductor according to an aspect of the present disclosure includes the steps of forming a coil; placing the coil in a mold; and forming a body. The step of forming the coil includes winding a conductive wire having a pair of wide surfaces that are oppose to each other around a winding axis in two layers, which are an upper layer and a lower layer, such that the wide surfaces are parallel to the winding axis to form a wound portion having end portions at an outermost periphery of the wound portion; forming a pair of lead-out portions by extending the conductive wire from the outermost periphery of the wound portion in extending directions that form acute angles with respect to extension lines of center lines of the end portions of the wound portion; twisting the pair of lead-out portions about axes that extend in the extending directions; forming first bent portions by bending the twisted pair of lead-out portions toward one end surface of the wound portion; and forming second bent portions by bending terminal end regions of the bent pair of lead-out portions toward the winding axis of the wound portion. The step of placing the coil in the mold includes placing the coil formed in the step of forming the coil in the mold together with a first preform containing magnetic powder; and placing a second preform containing magnetic powder above the one end surface of the wound portion and between the second bent portions of the pair of lead-out portions. The step of forming the body includes compressing the coil placed in the mold from the terminal end regions to form the body.

According to the inductor and the method for manufacturing the inductor of an aspect of the present disclosure, the connection reliability between the body and the outer electrodes can be increased.

Other features, elements, characteristics and advantages of the present disclosure will become more apparent from the following detailed description of preferred embodiments of the present disclosure with reference to the attached drawings.

DETAILED DESCRIPTION

Figure 1:
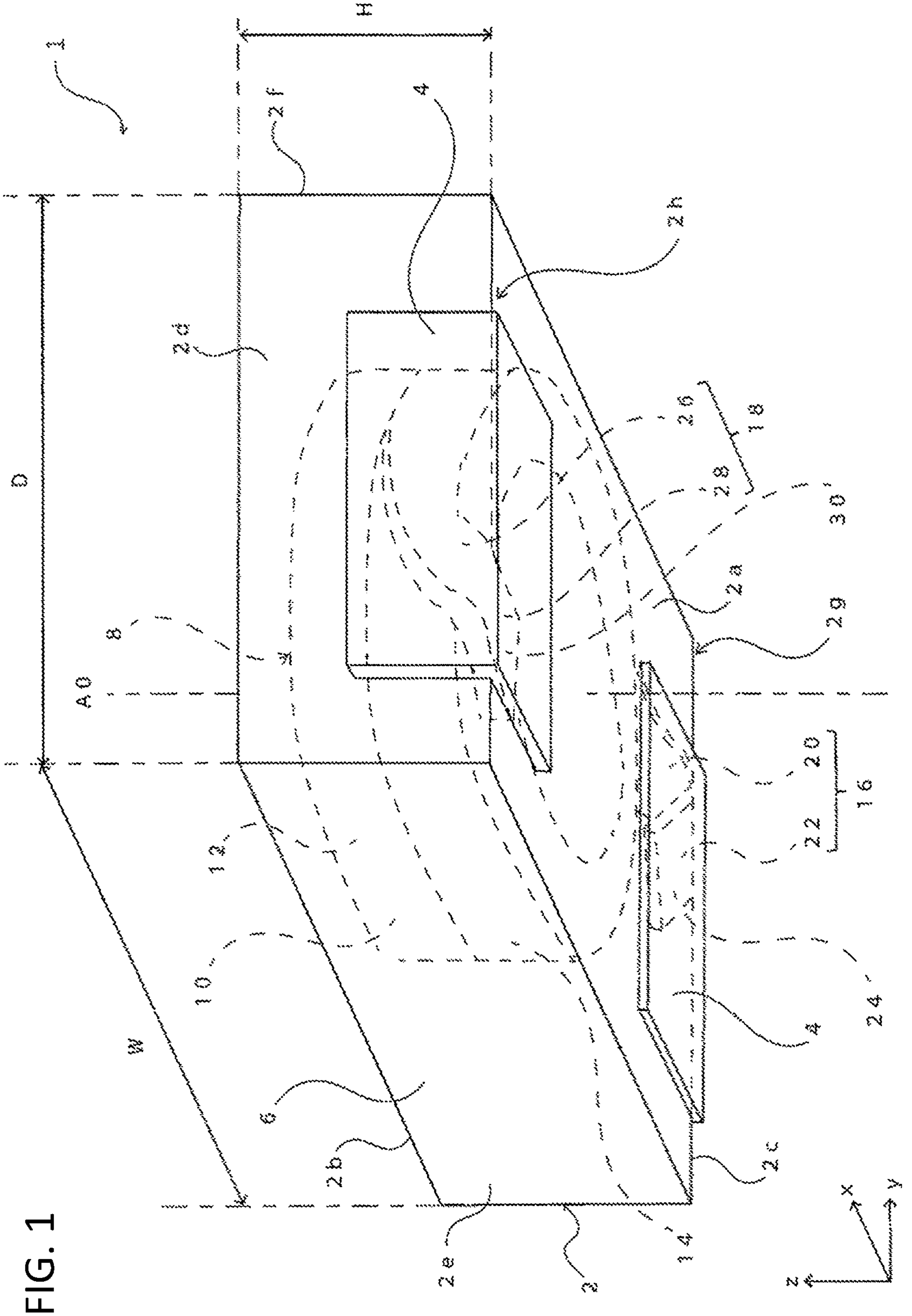
FIG. 1 is a perspective view of an inductor according to an embodiment of the present disclosure viewed from below.

An embodiment of the present disclosure will now be described in detail below with reference to the drawings. In the following description, terms representing specific directions and positions (for example, "up", "down", "right", "left", and terms including these terms) are used as necessary. These terms are used to facilitate understanding of the disclosure with reference to the drawings, and the meaning thereof does not limit the technical scope of the present disclosure. In addition, in the drawings, the same reference signs denote the same components.

In the embodiment and examples described below, description of previously described features will be omitted, and only differences will be described. In particular, description of similar operational effects provided by similar structures will not be repeated for each embodiment or example.

1. Embodiment

An inductor 1 according to a first embodiment of the present disclosure will be described with reference to FIGS. 1 to 4.

Figure 2:
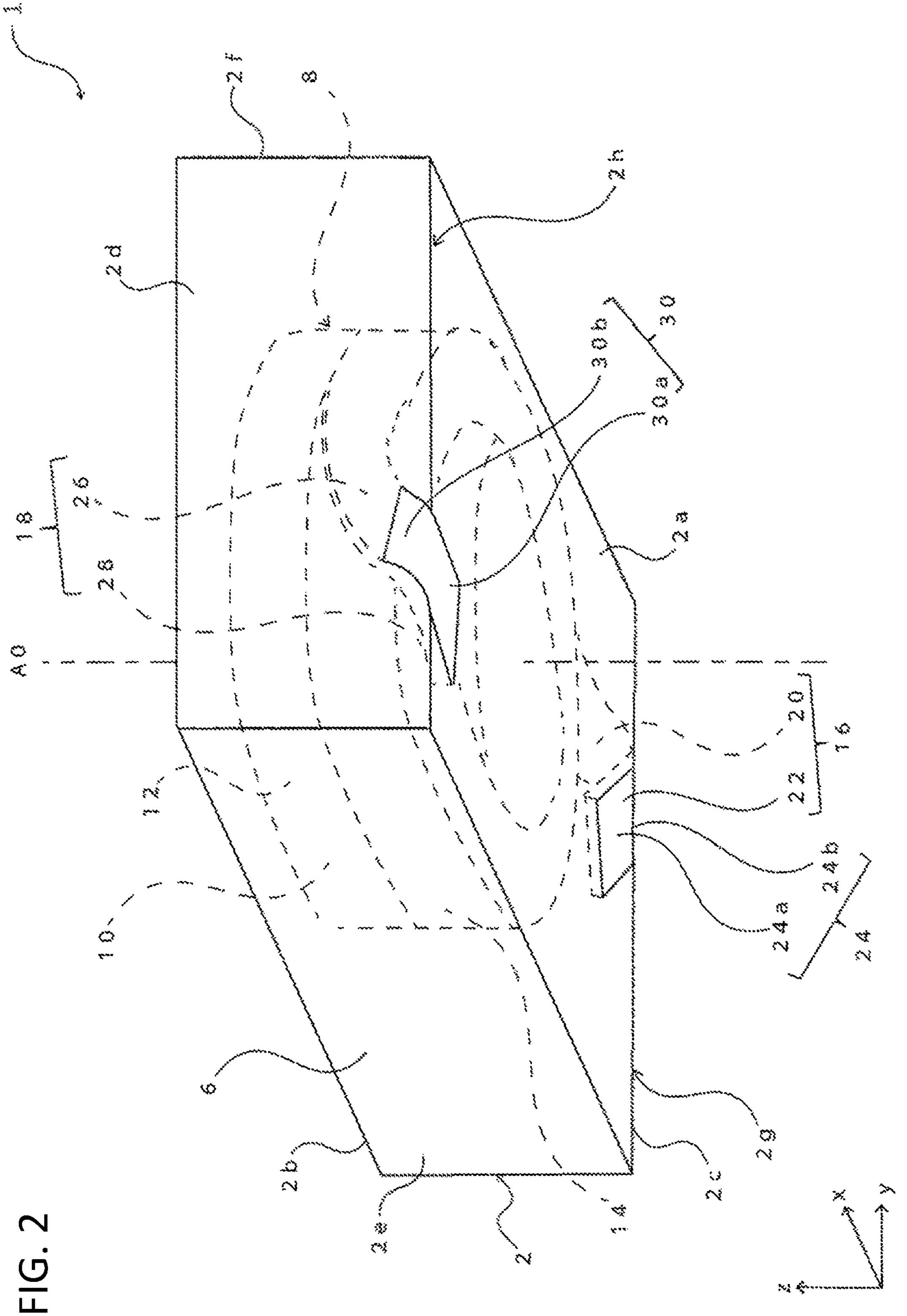
FIG. 2 is a perspective view of a body illustrated in FIG. 1 viewed from below.
Figure 3:
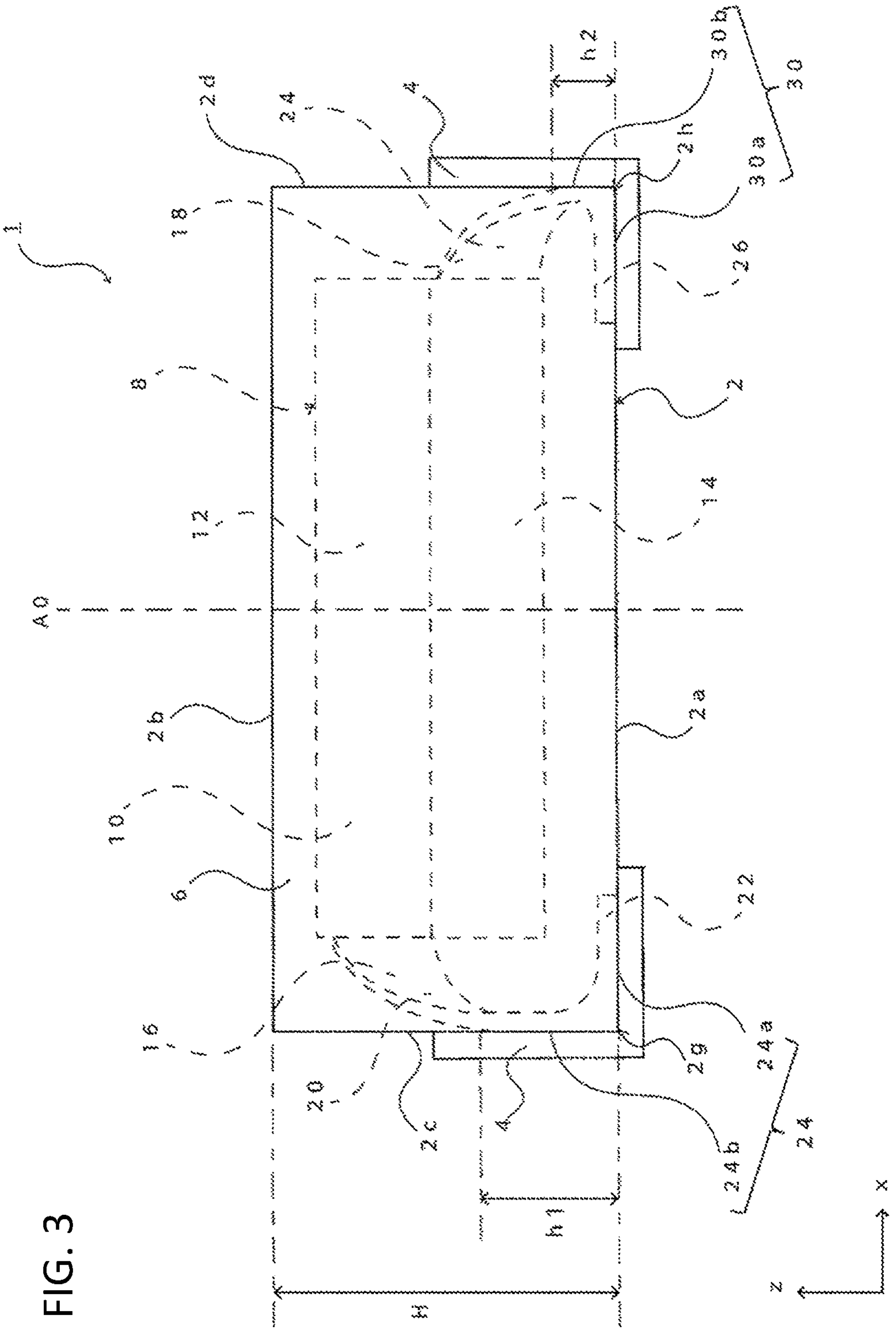
FIG. 3 is a side view of the inductor illustrated in FIG. 1.
Figure 4:
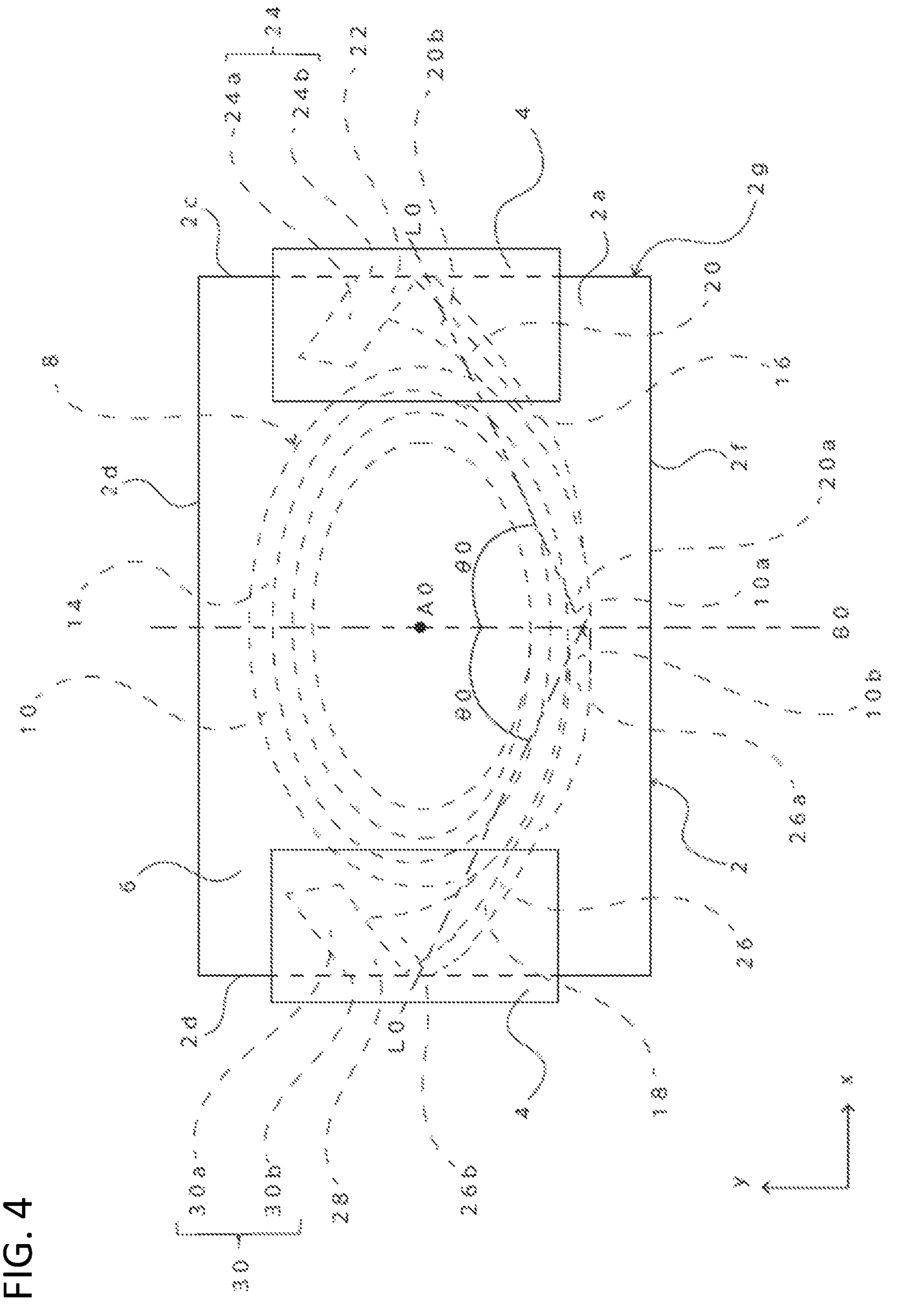
FIG. 4 is a bottom view of the inductor illustrated in FIG. 1.

FIG. 1 is a perspective view of the inductor according to the embodiment of the present disclosure viewed from below. FIG. 2 is a perspective view of a body illustrated in FIG. 1 viewed from below. FIG. 3 is a side view of the inductor illustrated in FIG. 1. FIG. 4 is a bottom view of the inductor illustrated in FIG. 1.

As illustrated in FIG. 1, the inductor 1 according to the present embodiment includes a substantially externally rectangular parallelepiped-shaped body 2 and a pair of outer electrodes 4 disposed on the body 2. The body 2 includes a coil 8 and a magnetic portion 6 in which the coil 8 is embedded.

The coil 8 is composed of a conductive wire including a conductor, an insulating coating layer provided on a surface of the conductor, and a welded layer provided on a surface of the coating layer. The conductive wire is a so-called rectangular wire including a pair of wide surfaces that are opposite to each other and having a substantially rectangular cross section. The coil 8 is a so-called a winding coil including a wound portion 10 in which a single conductive wire is wound in two layers, which are upper and lower layers, and a pair of lead-out portions 16 and 18 that extend from the outermost periphery of the wound portion 10. The lead-out portions 16 and 18 respectively include twisted portions 20 and 26 that extend from the outermost periphery of the wound portion 10 and distal end portions 22 and 28 that extend from the twisted portions 20 and 26.

One wide surface 24 of the distal end portion 22 of one lead-out portion (first lead-out portion) 16 is exposed at a mounting surface 2*a* of the body 2, a first surface 2*c* of the body 2 that is adjacent to the mounting surface 2*a*, and a corner portion (first corner portion) 2*g* between the mounting surface 2*a* and the first surface 2*c*. The wide surface 24 of the distal end portion 22 of the lead-out portion (first lead-out portion) 16 that is exposed at the surfaces of the body 2 has the conductor exposed, and is covered with and electrically connected to one of the outer electrodes 4.

One wide surface 30 of the distal end portion 28 of the other lead-out portion (second lead-out portion) 18 is exposed at the mounting surface 2*a* of the body 2, a second surface 2*d* of the body 2 that is adjacent to the mounting surface 2*a*, and a corner portion (second corner portion) 2*h* between the mounting surface 2*a* and the second surface 2*d*. The wide surface 30 of the distal end portion 28 of the lead-out portion (second lead-out portion) 18 that is exposed at the surfaces of the body 2 has the conductor exposed, and is covered with and electrically connected to the other one of the outer electrodes 4.

Body

The body 2 includes the coil 8 and the magnetic portion 6. The body 2 is substantially externally rectangular parallelepiped-shaped and has a long-side direction x and a short-side direction y. The body 2 includes the mounting surface 2*a*, which is the bottom surface; an upper surface 2*b* that is opposite to the mounting surface 2*a*; the first surface 2*c* and the second surface 2*d*, which extend in the short-side direction y; and a third surface 2*e* and a fourth surface 2*f*, which extend in the long-side direction x. The dimensions of the body 2 are such that, for example, a length W in the long-side direction x is in the range from about 2.0 mm to about 5.0 mm, a length D in the short-side direction y is in the range from about 1.2 mm to about 5.0 mm, and a length H in the height direction z is in the range from about 0.65 mm to about 2 mm Coil The conductor included in the conductive wire that constitutes the coil 8 is made of, for example, copper, and has a width in the range from about 150 μm to about 600 μm and a thickness in the range from about 30 μm to about 200 μm. The coating layer is made of an insulating resin, such as polyamide-imide, and the thickness thereof is, for example, in the range from about 2 μm to about 12 μm, and preferably about 6 μm. The welded layer is made of, for example, a thermoplastic resin or a thermosetting resin containing a self-welding component so that portions of the conductive wire that constitute the wound portion 10 can be fixed to each other, and the thickness thereof is, for example, in the range from about 1 μm to about 8 μm, and preferably about 4 μm. Accordingly, for example, the conductive wire has a length in the range from about 156 μm to about 640 μm in the wire width direction and a thickness in the range from about 36 μm to about 240 μm.

The wound portion 10 is formed by winding the above-described conductive wire in two layers, which are an upper layer 12 and a lower layer 14, such that the wide surfaces of the conductive wire are substantially parallel to a winding axis A0. The upper layer 12 and the lower layer 14 of the wound portion 10 are connected to each other at the innermost periphery of the wound portion 10. One end portion

10*a* of the wound portion 10 is positioned at the outermost periphery of the upper layer 12, and the other end portion 10*b* of the wound portion 10 is positioned at the outermost periphery of the lower layer 14. As illustrated in FIG. 4, the end portion 10*a* and the end portion 10*b* are disposed on or near a plane B0 including the winding axis A0 of the wound portion 10 and extending in the short-side direction y of the body. The wound portion 10 is disposed in the body 2 such that the winding axis A0 is substantially orthogonal to the mounting surface 2*a* of the body 2. The end portions 10*a* and 10*b* of the wound portion 10 at the outermost periphery of the wound portion 10 are respectively connected to the lead-out portions 16 and 18.

The twisted portion (first twisted portion) 20 of the first lead-out portion 16 extends between the end portion 10*a* on the upper layer 12 of the wound portion 10 and the distal end portion (first distal end portion) 22 of the first lead-out portion 16. The first twisted portion 20 extends from the wound portion 10, and therefore the wide surfaces of a wound-portion-side end portion 20*a* thereof are substantially parallel to the winding axis A0. The wide surfaces of a distal-side end portion 20*b* of the first twisted portion 20 are substantially parallel to the mounting surface 2*a*. In other words, the first twisted portion 20 is gently twisted such that the direction in which the wide surfaces of the wound-portion-side end portion 20*a* extend and the direction in which the wide surfaces of the distal-side end portion 20*b* extend differ from each other by about 90°. The wound-portion-side end portion 20*a* is a very small region including an end adjacent to the wound portion 10. The distal-side end portion 20*b* is a very small region including an end adjacent to the distal end of the first lead-out portion 16. Therefore, the direction in which the wide surfaces of the wound-portion-side end portion 20*a* extend and the wide surfaces of the distal-side end portion 20*b* extend can be approximated with a straight line extending in the direction in which the first lead-out portion 16 extends. As illustrated in FIG. 4, a straight line L0 connecting the wound-portion-side end and the distal end of the first twisted portion 20 crosses the plane B0 extending in the short-side direction y of the body when viewed from the mounting surface of the body. One of the angles formed by the straight line L0 and the plane B0 that is adjacent to the winding axis A0 is an acute angle θ0. The angle θ0 is, for example, in the range from about 45° to about 70°.

As illustrated in FIG. 2, the first distal end portion 22 is bent so that only one wide surface 24 is exposed at the mounting surface 2*a* of the body 2, the first surface 2*c* of the body 2, and the first corner portion 2*g* between the mounting surface 2*a* and the first surface 2*c*. A wide surface 24*a* that is exposed at the mounting surface 2*a* is flush with the mounting surface 2*a*. A wide surface 24*b* that is exposed at the first surface 2*c* is flush with the first surface 2*c*.

As illustrated in FIG. 3, the wide surface 24*b* exposed at the first surface 2*c* of the body 2 preferably has a height h1 that is less than or equal to half of the height H of the inductor 1.

The twisted portion (second twisted portion) 26 of the second lead-out portion 18 extends between the end portion 10*b* on the lower layer 14 of the wound portion 10 and the distal end portion (second distal end portion) 28 of the second lead-out portion 18. The second twisted portion 26 extends from the wound portion 10, and therefore the wide surfaces of a wound-portion-side end portion 26*a* thereof are substantially parallel to the winding axis A0. The wide surfaces of a distal-side end portion 26*b* of the second twisted portion 26 are substantially parallel to the mounting surface 2*a*. In other words, the second twisted portion 26 is gently twisted such that the direction in which the wide surfaces of the wound-portion-side end portion 26*a* extend and the direction in which the wide surfaces of the distal-side end portion 26*b* extend differ from each other by about 90°. The wound-portion-side end portion 26*a* is a very small region including an end adjacent to the wound portion 10. The distal-side end portion 26*b* is a very small region including an end adjacent to the distal end of the second lead-out portion 18. Therefore, the direction in which the wide surfaces of the wound-portion-side end portion 26*a* extend and the wide surfaces of the distal-side end portion 26*b* extend can be approximated with a straight line extending in the direction in which the second lead-out portion 18 extends. As illustrated in FIG. 4, a straight line L0 connecting the wound-portion-side end and the distal end of the second twisted portion 18 crosses the plane B0 extending in the short-side direction y of the body when viewed from the mounting surface of the body. One of the angles formed by the straight line L0 and the plane B0 that is adjacent to the winding axis A0 is an acute angle θ0. The angle θ0 is, for example, in the range from about 45° to about 70°.

As illustrated in FIG. 2, the second distal end portion 28 is bent so that only one wide surface 30 is exposed at the mounting surface 2*a* of the body 2, the second surface 2*d* of the body 2, and the second corner portion 2*h* between the mounting surface 2*a* and the second surface 2*d*. A wide surface 30*a* that is exposed at the mounting surface 2*a* is flush with the mounting surface 2*a*. A wide surface 30*b* that is exposed at the second surface 2*d* is flush with the second surface 2*d*.

As illustrated in FIG. 3, the wide surface 30*b* exposed at the second surface 2*d* of the body 2 preferably has a height h2 that is less than or equal to half of the height H of the inductor 1.

Magnetic Portion

The coil 8 is embedded in the magnetic portion 6. The wide surfaces 24 and 30 of the distal end portions 22 and 28 of the lead-out portions 16 and 18 are exposed at a surface of the magnetic portion 6.

The magnetic portion 6 is formed by pressure molding by using a mixture of magnetic powder and a resin. The content of the magnetic powder in the mixture is, for example, greater than or equal to about 60 weight percent, and preferably greater than or equal to about 80 weight percent. The magnetic powder may be iron-based metal magnetic powder, such as powder of Fe, Fe—Si—Cr, Fe—Ni—Al, Fe—Cr—Al, Fe—Si, Fe—Si—Al, Fe—Ni, or Fe—Ni—Mo, metal magnetic powder of other compositions, amorphous metal magnetic powder, metal magnetic powder whose surface is coated with an insulating material, such as glass, surface-reformed metal magnetic powder, or nano-scale metal magnetic powder. The resin may be a thermosetting resin, such as epoxy resin, polyimide resin, or phenolic resin, or a thermoplastic resin, such as polyethylene resin or polyamide resin.

Outer Electrode

The pair of outer electrodes 4 are formed on the surfaces of the body 2 and are spaced from each other. One outer electrode 4 extends along the first surface 2*c* and the mounting surface 2*a* of the body 2. This outer electrode 4 covers the wide surface 24 exposed at the surfaces of the body 2, and is electrically connected to the conductor on the wide surface 24. The other outer electrode 4 extends along the second surface 2*d* and the mounting surface 2*a* of the body 2. This outer electrode 4 covers the wide surface 30 exposed at the surfaces of the body 2, and is electrically connected to the conductor on the wide surface 30.

The pair of outer electrodes 4 are made of, for example, a conductive resin containing metal particles and a resin. Silver particles may be used as the metal particles. The resin may be epoxy resin. The pair of outer electrodes 4 each include a first layer made of nickel and formed on the conductive resin containing the metal particles and resin and a second layer made of tin and formed on the first layer.

The above-described inductor is structured such that the wide surface 24 of the distal end portion 22 of the first lead-out portion 16 is exposed at the mounting surface 2*a* of the body 2, the first surface 2*c* of the body 2, and the first corner portion 2*g* between the mounting surface 2*a* and the first surface 2*c*, and such that the conductor on the wide surface 24 of the distal end portion 22 of the first lead-out portion 16 is connected to one of the outer electrodes 4. In addition, the above-described inductor is structured such that the wide surface 30 of the distal end portion 28 of the second lead-out portion 18 is exposed at the mounting surface 2*a* of the body 2, the second surface 2*d* of the body 2, and the second corner portion 2*h* between the mounting surface 2*a* and the second surface 2*d*, and such that the conductor on the wide surface 30 of the distal end portion 28 of the second lead-out portion 18 is connected to the other one of the outer electrodes 4. Thus, the metal particles contained in the outer electrodes 4 can be joined to the conductors of the distal end portions 22 and 28 of the lead-out portions 16 and 18 not only on the mounting surface 2*a* of the body 2 but also on the first surface 2*c* and the second surface 2*d* of the body 2. Therefore, even when the resin contained in the outer electrodes is degraded, the connection reliability between the body and the outer electrodes can be improved. Accordingly, even when the inductor receives a force after being soldered onto a substrate, the outer electrodes can be prevented from being removed from the first surface 2*c* and the second surface 2*d* of the body 2, and the joining strength between the inductor 1 and the substrate on which the inductor 1 is disposed can be increased.

In addition, the above-described inductor is structured such that the lead-out portions 16 and 18 are gently twisted in the body 2 so that the wide surfaces 24 and 30 of the distal end portions 22 and 28 are exposed at the surfaces 2*a*, 2*c*, and 2*d* of the body 2. Accordingly, the lead-out portions 16 and 18 can be prevented from receiving excessive load, and the distal end portions 22 and 28 can be exposed at the surfaces of the body 2 over sufficiently large regions.

The inductor having the above-described structure includes the body 2 and the pair of outer electrodes 4. The body 2 is substantially externally rectangular parallelepiped-shaped and includes the magnetic portion 6 containing magnetic powder and the coil 8 embedded in the magnetic portion 6. The pair of outer electrodes 4 are provided on the body 2 and connected to the coil 8. The coil 8 includes the wound portion 10 formed by winding a conductive wire in the upper layer 12 and the lower layer 14, the conductive wire having a pair of wide surfaces that are opposite to each other, and the pair of lead-out portions 16 and 18, one of which extends from one end portion 10*a* of the wound portion 10 positioned at the outermost periphery of the upper layer 12 and the other of which extends from the other end portion 10*b* of the wound portion 10 positioned at the outermost periphery of the lower layer 14. The pair of lead-out portions 16 and 18 include the first lead-out portion 16 and the second lead-out portion 18. One wide surface 24 of the distal end portion 22 of the first lead-out portion 16 is exposed at the mounting surface 2*a* of the body 2, the first surface 2*c* of the body 2 that is adjacent to the mounting surface 2*a*, and the corner portion 2*g* between the mounting surface 2*a* and the first surface 2*c*. One wide surface 30 of the distal end portion 28 of the second lead-out portion 18 is exposed at the mounting surface 2*a* of the body 2, the second surface 2*d* of the body 2 that is adjacent to the mounting surface 2*a*, and the corner portion 2*h* between the mounting surface 2*a* and the second surface 2*d*. The pair of outer electrodes 4 cover the wide surface 24 of the first lead-out portion 16 and the wide surface 30 of the second lead-out portion 18 exposed at the surfaces of the body 2.

2. Manufacturing Method

Figure 5A:
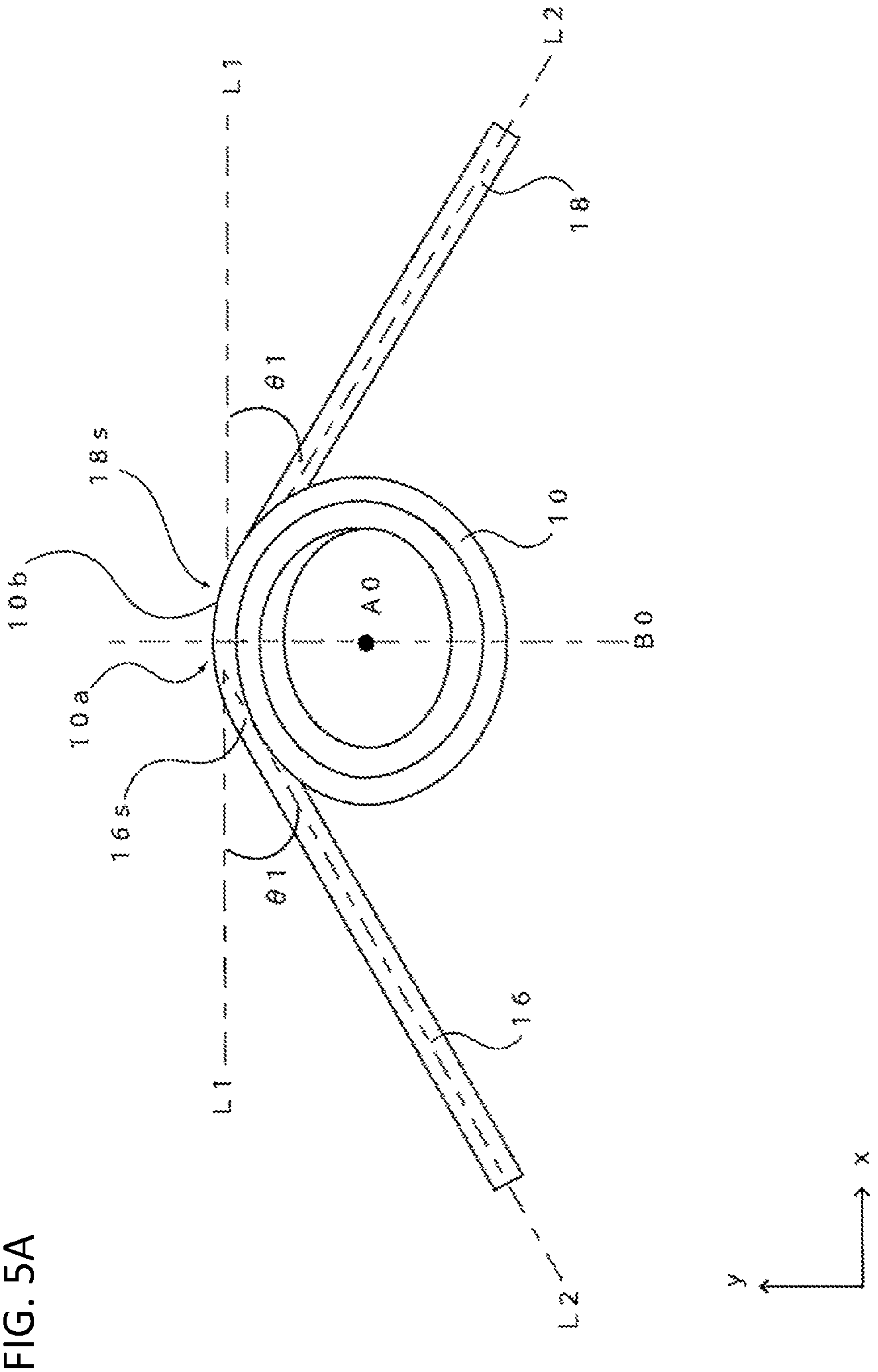
FIG. 5A is a top view illustrating a process for manufacturing the inductor according to the embodiment.
Figure 5B:
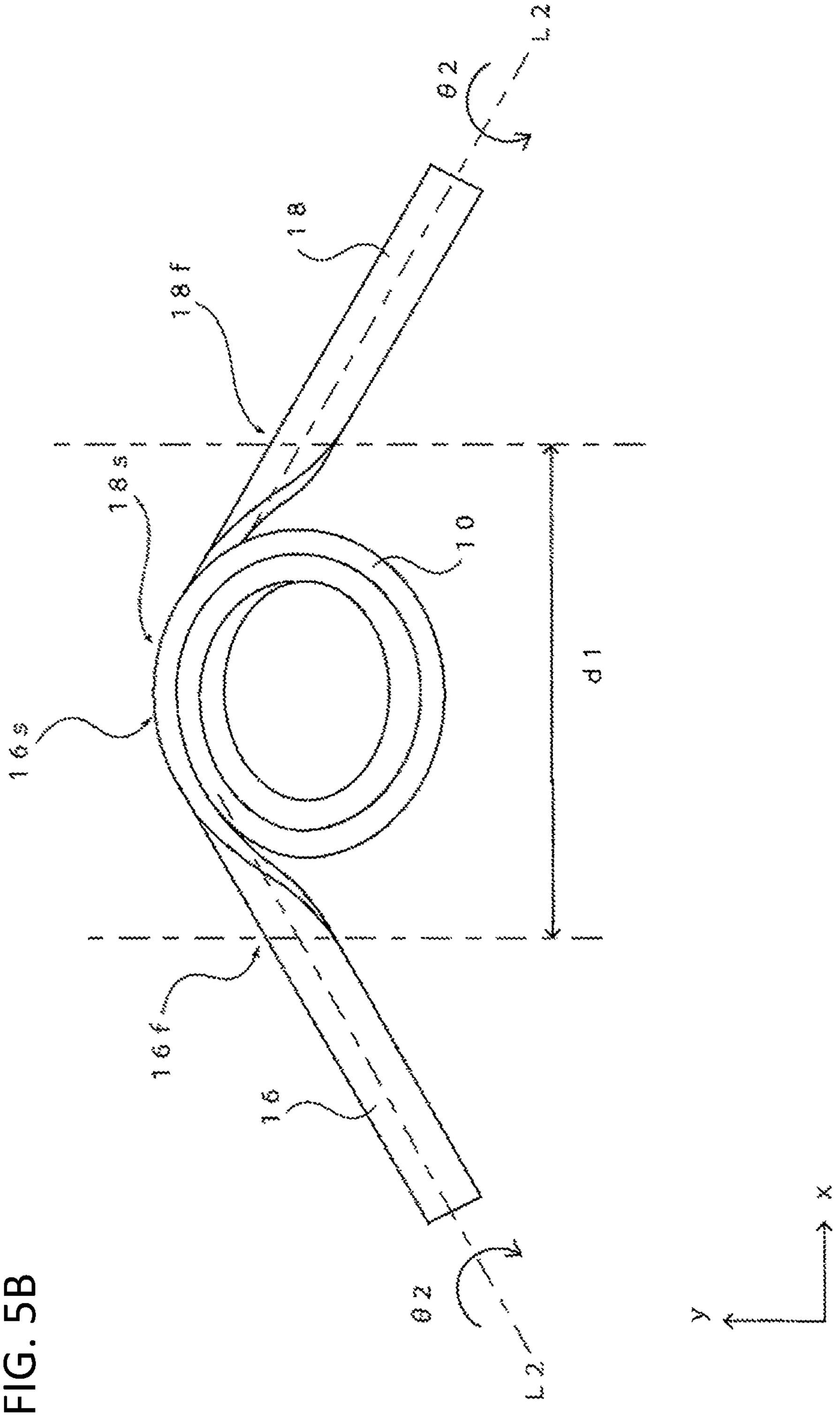
FIG. 5B is a top view illustrating a process for manufacturing the inductor according to the embodiment.

A method for manufacturing the inductor according to the embodiment will now be described with reference to FIGS. 5A to 5H. FIGS. 5A and 5B are top views illustrating processes for manufacturing the inductor according to the embodiment. FIGS. 5C to 5H are side views illustrating processes for manufacturing the inductor according to the embodiment.

The method for manufacturing the inductor according to the embodiment includes the steps of:

1) Forming the coil 8;
2) Placing the coil 8 in a mold;
3) Forming the body 2; and
4) Forming the outer electrodes 4.

Each step will now be described in detail.

1) Step of Forming Coil

In this step, the coil 8 is formed by using a conductive wire (so-called rectangular wire) having a pair of wide surfaces that are opposite to each other. The conductive wire includes a conductor, an insulating coating layer formed on a surface of the conductor, and a welded layer formed on a surface of the coating layer.

First, the wound portion 10 is formed. The wound portion 10 is formed by winding a single conductive wire, which includes the pair of wide surfaces that are opposite to each other and has a substantially rectangular cross section, around the winding axis A0 in two layers that are upper and lower layers (in so-called a winding) such that the end portions 10*a* and 10*b* thereof are positioned at the outermost periphery. The conductive wire is wound such that the wide surfaces thereof are substantially parallel to the winding axis A0. The end portions 10*a* and 10*b* of the wound portion 10 are disposed on or near the plane B0 including the winding axis A0 and extending in the short-side direction y of the body, which will be described below (see FIG. 5A). In the following description, the directions in which the lead-out portions 16 and 18 extend are referred to as extending directions.

Next, the lead-out portions 16 and 18, which are portions of the conductive wire that extend from the outermost periphery of the wound portion 10, are formed. The lead-out portions 16 and 18 are arranged to extend such that extension lines L1 of the center lines of the end portions 10*a* and 10*b* of the wound portion 10 and center lines L2 of start portions 16*s* and 18*s* of the respective lead-out portions 16 and 18 form acute angles θ1. In other words, the lead-out portions 16 and 18 are arranged to extend such that extension surfaces of the wide surfaces of the end portions 10*a* and 10*b* of the wound portion 10 and the wide surfaces of the start portions 16*s* and 18*s* of the respective lead-out portions

16 and 18 form the acute angles θ1. The angles θ1 are, for example, preferably in the range from about 20° to about 45° (see FIG. 5A).

Next, the lead-out portions 16 and 18 that extend from the wound portion 10 are gently twisted about the center lines L2 of the start portions 16*s* and 18*s* by about 90°. The center lines L2 extend in the extending directions. The lead-out portions 16 and 18 are twisted so that a distance d1 between end portions 16*f* and 18*f* at which the twisting is completed is substantially half the length W of the body, which will be described below, in the long-side direction x (see FIG. 5B).

Figure 5C:
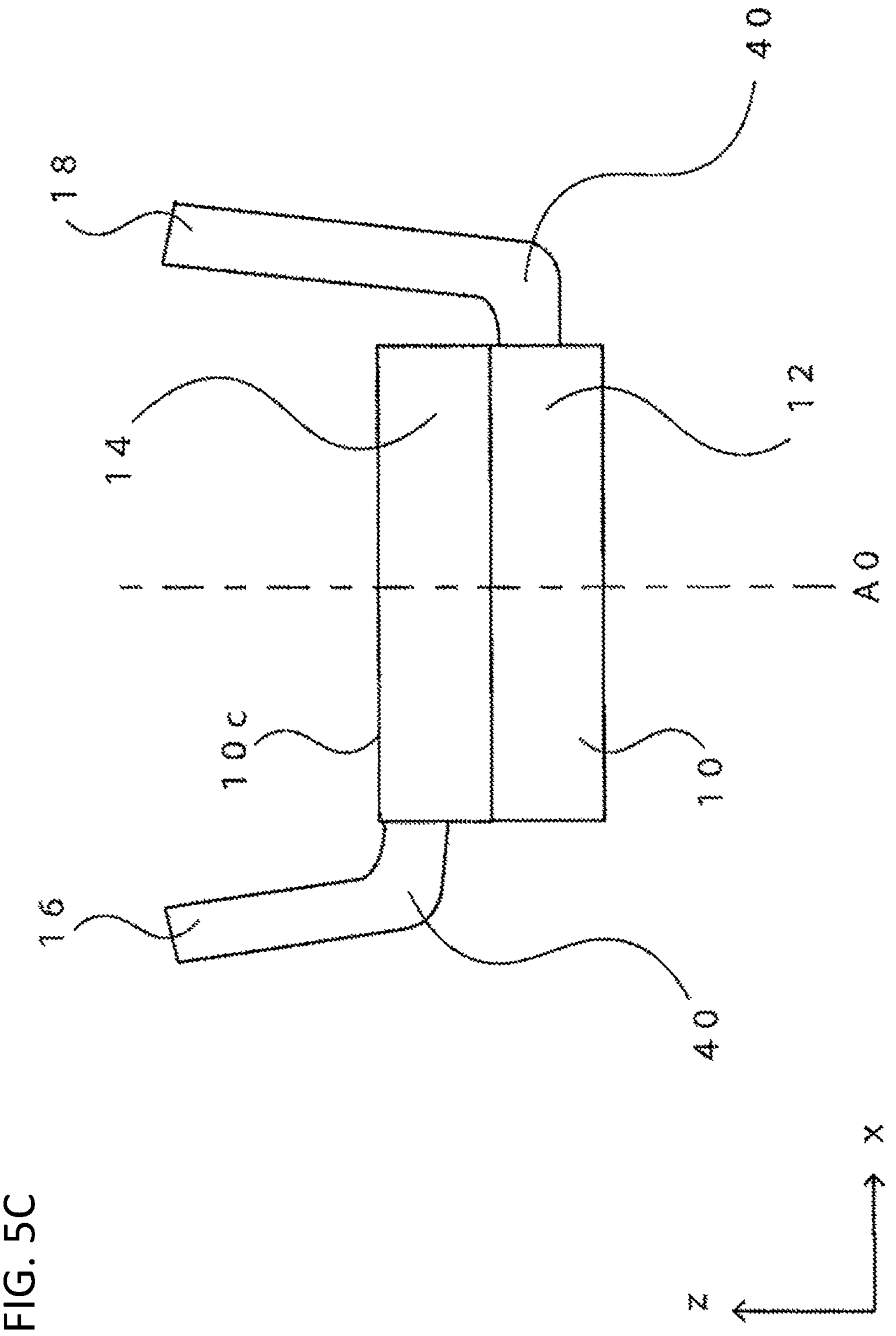
FIG. 5C is a side view illustrating a process for manufacturing the inductor according to the embodiment.

Next, the twisted lead-out portions 16 and 18 are bent toward one end surface 10*c* of the wound portion 10 (see FIG. 5C). The angles by which the lead-out portions 16 and 18 are bent are preferably obtuse angles. The bent portions formed in this step will be hereinafter referred to as first bent portions 40.

Figure 5D:
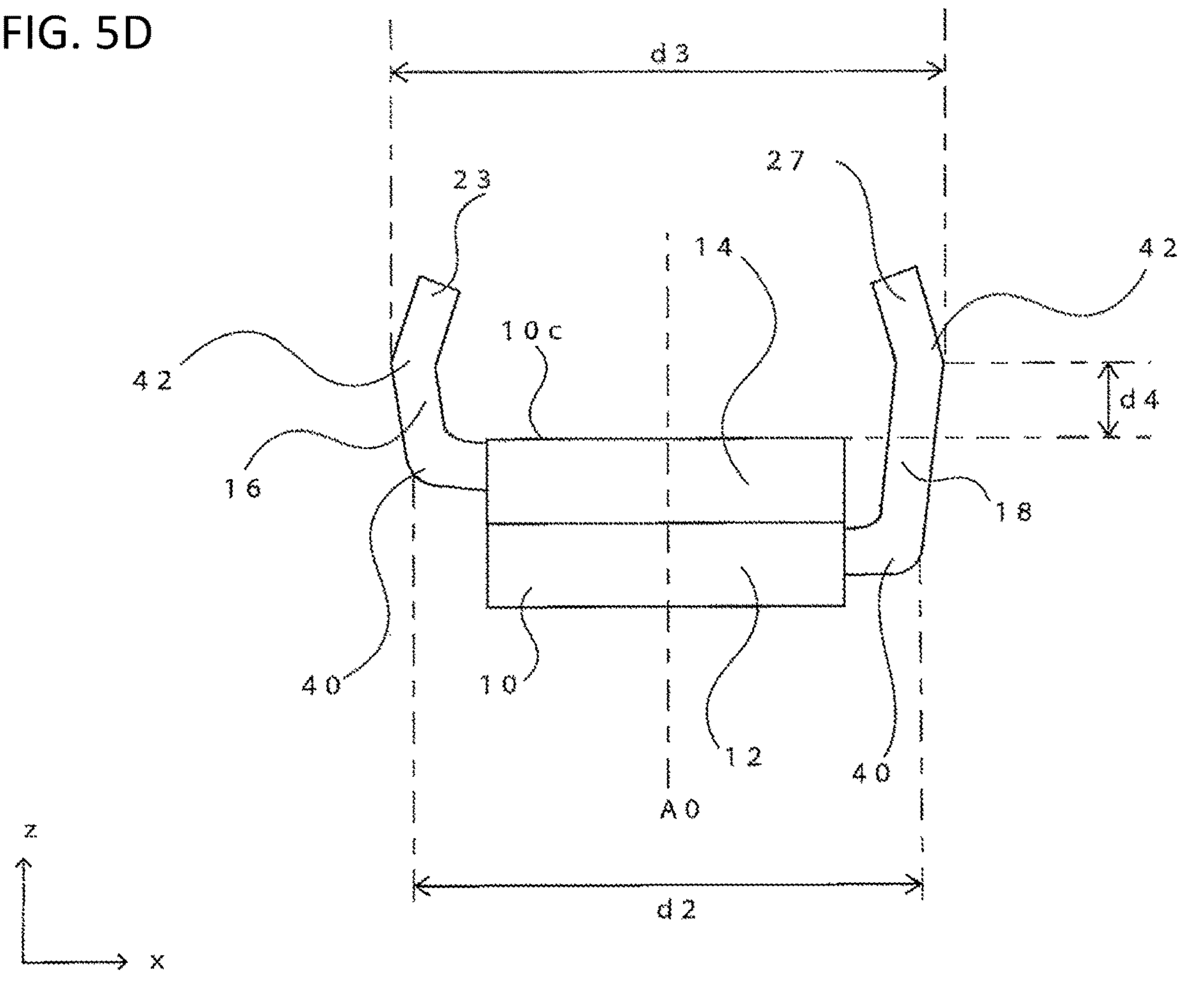
FIG. 5D is a side view illustrating a process for manufacturing the inductor according to the embodiment.

Then, terminal end regions 23 and 27 of the lead-out portions 16 and 18 are bent toward the winding axis A0 (see FIG. 5D). The angles by which the terminal end regions 23 and 27 are bent are preferably obtuse angles. The terminal end regions 23 and 27 correspond to the regions in which the wide surfaces 24 (24*a*) and 30 (30*a*) of the distal end portions 22 and 28 are exposed at the mounting surface 2*a* of the body described below. The bent portions formed in this step will be hereinafter referred to as second bent portions 42.

A distance d3 between the second bent portions 42 is set to be greater than a distance d2 between the first bent portions 40 and equal to or slightly less than an inner width d5 of a mold 60 used in a step described below. A distance d4 from the end surface 10*c* of the wound portion 10 to the second bent portions is set to be substantially equal to a thickness t1 of a second preform 52 used in the step described below.

2) Step of Placing Coil in Mold

Figure 5E:
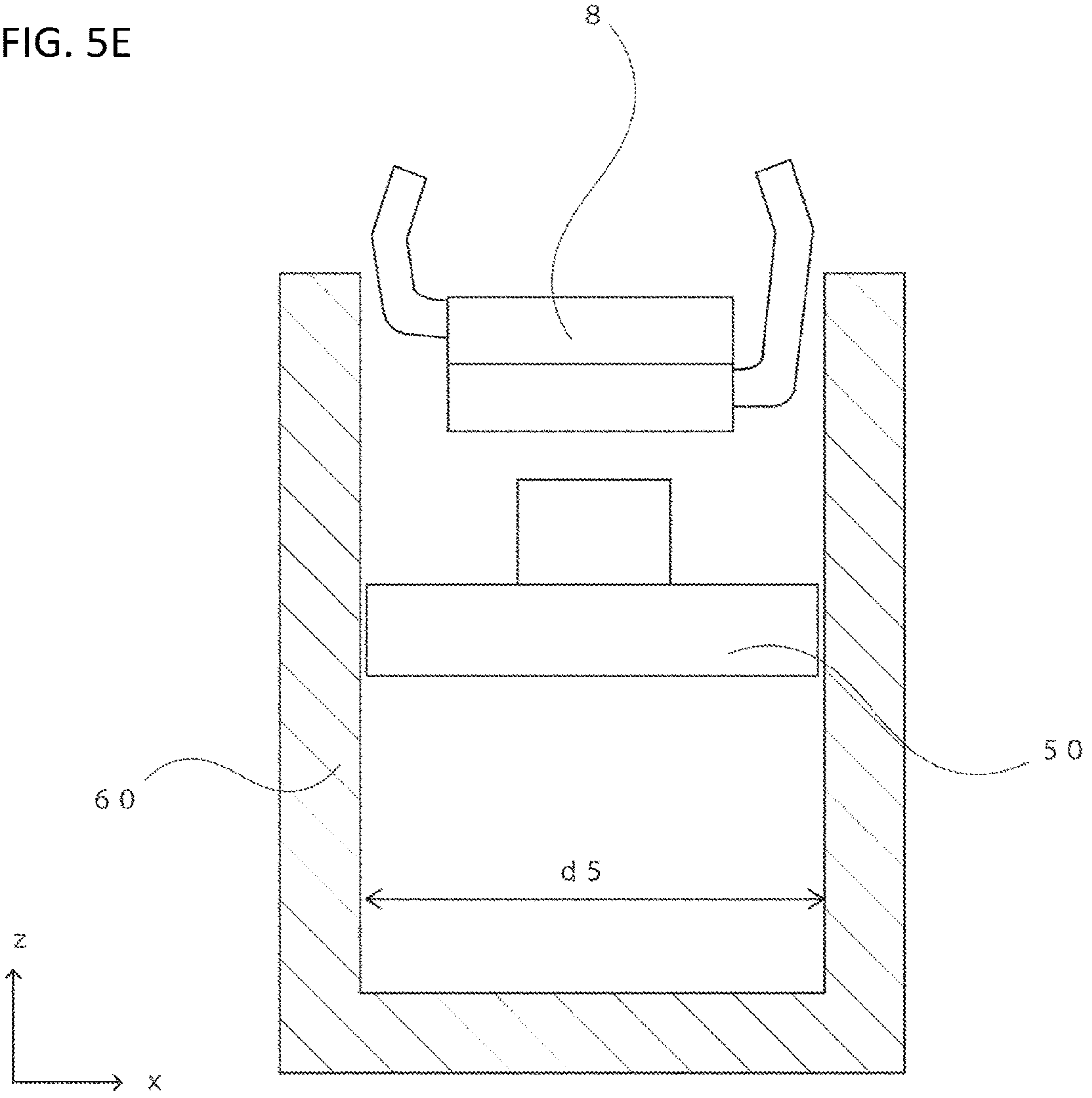
FIG. 5E is a side view illustrating a process for manufacturing the inductor according to the embodiment.

In this step, the coil 8 formed as described above is attached to a first preform 50 and placed in the mold 60 (see FIG. 5E). The first preform 50 is, for example, a molded body formed by molding a composite material containing a resin and magnetic powder. The first preform 50 is, for example, a molded body including a substrate and a column portion provided on the substrate and having a substantially T-shaped cross section or a molded body including a substrate, a column portion provided on the substrate, and side wall portions and having a substantially E-shaped cross section. The coil 8 is disposed such that the column portion of the first preform 50 extends through the wound portion 10.

Figure 5F:
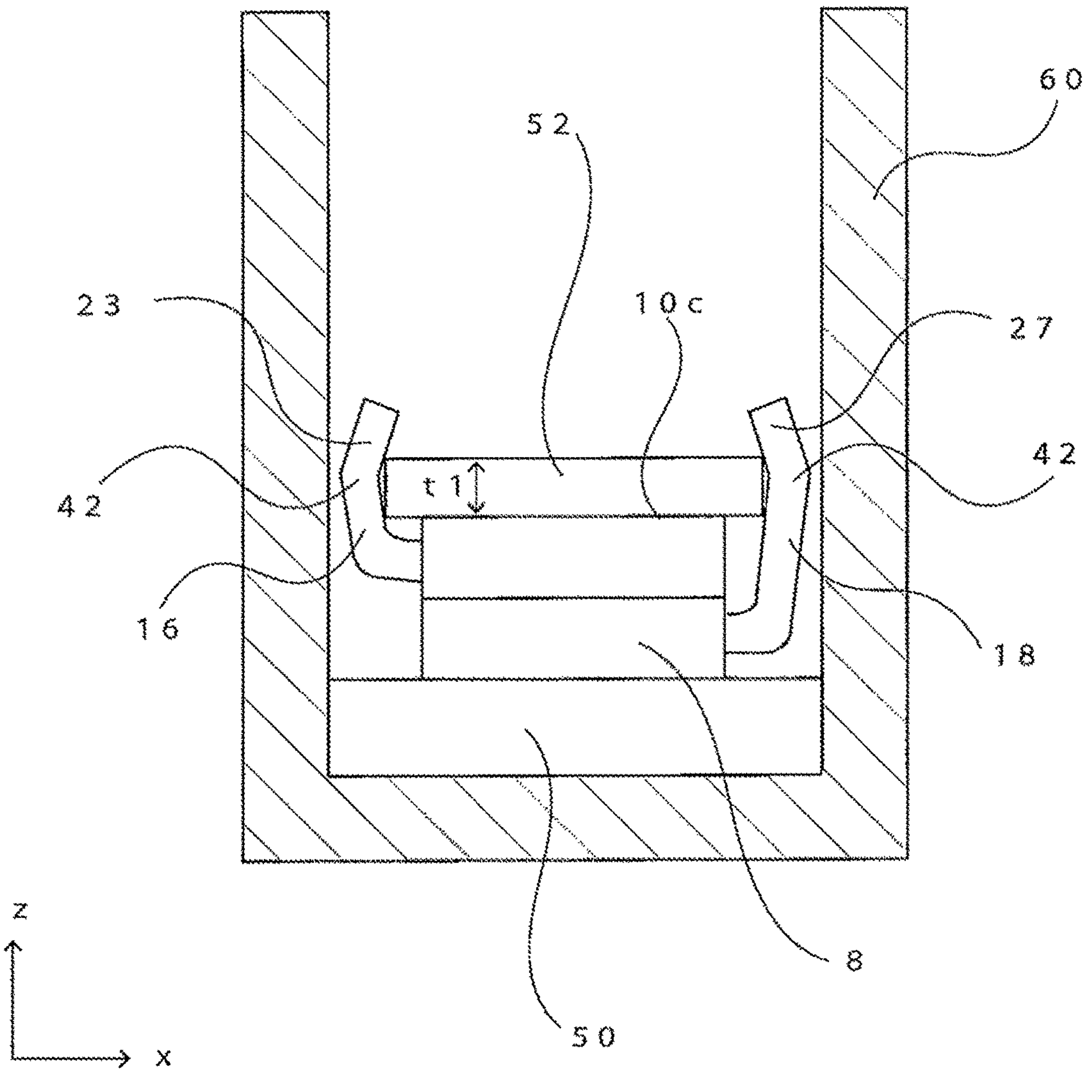
FIG. 5F is a side view illustrating a process for manufacturing the inductor according to the embodiment.

Then, the second preform 52, which is substantially plate-shaped, is placed on the end surface 10*c* of the wound portion 10 (see FIG. 5F). The second preform 52 is, for example, a molded body formed by molding a composite material containing a resin and magnetic powder. The lead-out portions 16 and 18 are placed so that the second preform 52 is positioned between the second bent portions 42. Accordingly, the wound portion 10 and each of the terminal end regions 23 and 27 of the lead-out portions 16 and 18 are on the opposite sides of the second preform 52.

3) Step of Forming Body

Figure 5G:
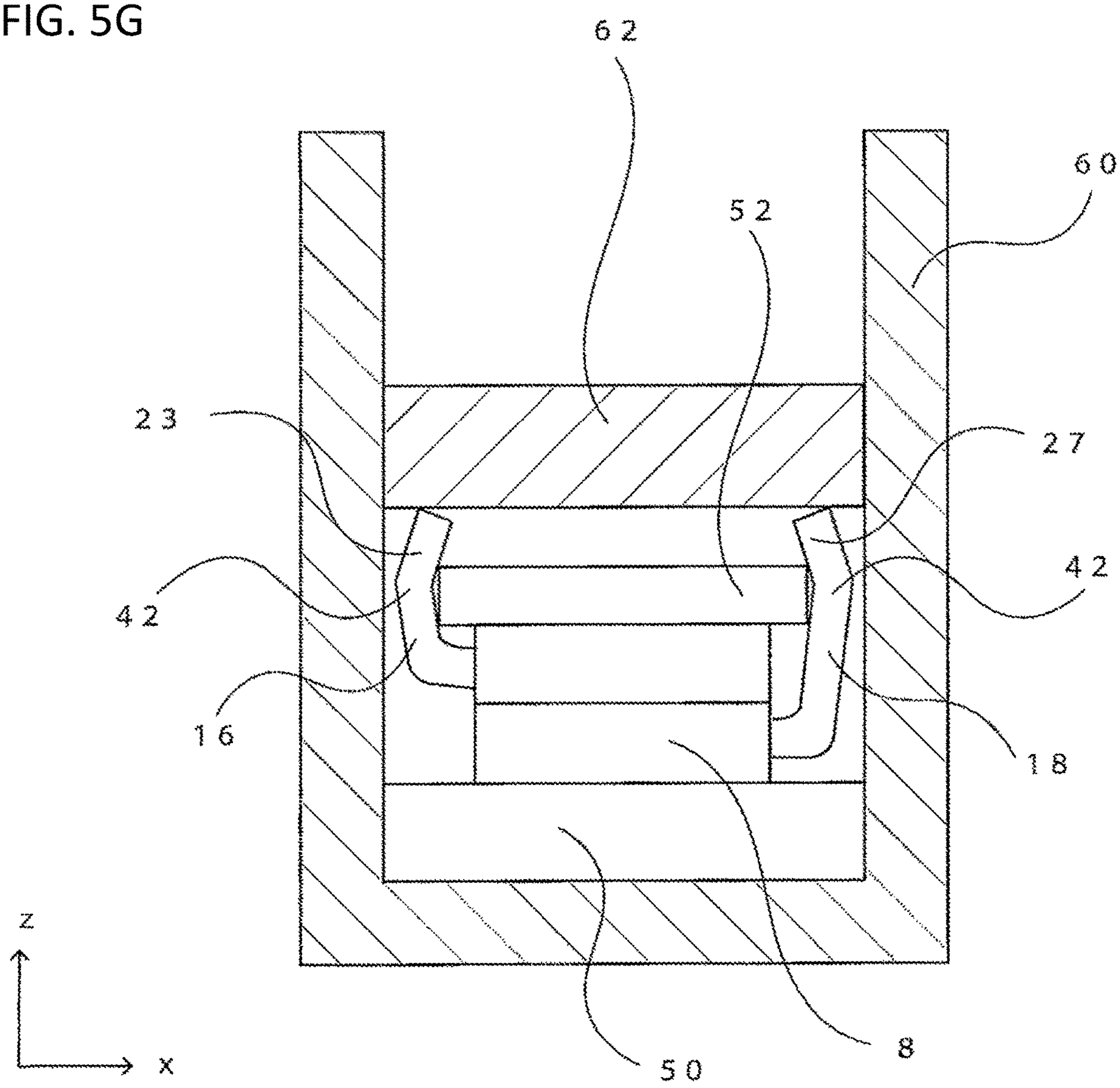
FIG. 5G is a side view illustrating a process for manufacturing the inductor according to the embodiment.
Figure 5H:
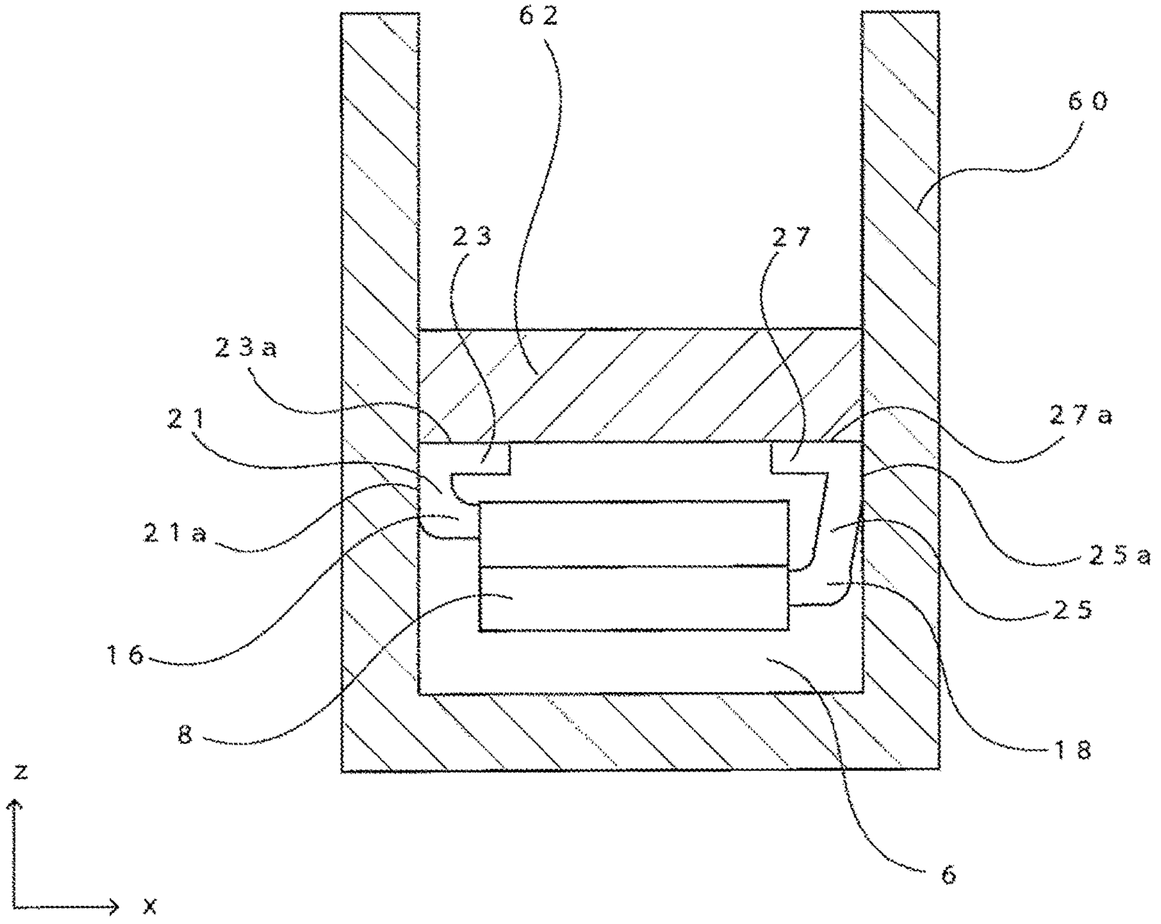
FIG. 5H is a side view illustrating a process for manufacturing the inductor according to the embodiment.

In this step, the body 2 is formed by pressing the two preforms 50 and 52 and the coil 8 disposed therebetween from a side of the second preform 52 (see FIG. 5G). A pressing mold 62 starts to press the terminal end regions 23 and 27 of the lead-out portions 16 and 18 first. Subsequently, the pressing mold 62 presses the second preform 52. Accordingly, the second preform 52 is deformed and the material of the second preform 52 flows into clearances, thereby covering the coil 8. In addition, the terminal end regions 23 and 27 are bent by the pressing mold 62 and pressed in such a state that wide surfaces 23*a* and 27*a* thereof are in contact with a surface of the pressing mold 62. As a result, the wide surfaces 23*a* and 27*a* of the terminal end regions 23 and 27 are pressed while the wide surfaces 23*a* and 27*a* are not covered by the material of the second preform 52 and are exposed. When the pressing is continued, regions 21 and 25 that extend from the terminal end regions 23 and 27 beyond the second bent portions 42 are pressed against the side walls of the mold 6 such that wide surfaces 21*a* and 25*a* thereof are pressed against the side walls (see FIG. 5H). These regions 21 and 25 correspond to the regions in which the wide surfaces 24 (24*b*) and 30 (30*b*) of the distal end portions 22 and 28 are exposed at the first surface 2*c* and the second surface 2*d* of the body described below. The material of the second preform 52 that is pressed and deformed continues to flow into clearances and covers portions other than the wide surfaces 21*a* and 25*a* and the wide surfaces 23*a* and 27*a*.

As a result of the above-described pressing process, the body 2 is formed in which the wide surfaces 24 and 30 of the distal end portions 22 and 28 are exposed at the mounting surface 2*a*, the surfaces 2*c* and 2*d* adjacent to the mounting surface 2*a*, and the corner portions 2*g* and 2*h* between the mounting surface 2*a* and the surfaces 2*c* and 2*d*.

4) Step of Forming Outer Electrodes

The wide surfaces 24 and 30 of the distal end portions 22 and 28 exposed at the surfaces of the body are each processed to remove the coating layer and the welded layer so that the conductor is exposed. After that, resin silver paste, for example, is applied to the mounting surface 2*a* of the body, the surface 2*c* adjacent to the mounting surface 2*a*, and the surface 2*d* adjacent to the mounting surface 2*a* to form the outer electrodes 4 that cover the exposed portions.

Although the embodiment of the present disclosure has been described, details of the disclosed structure may be changed, and changes in the combinations and the order of the components of the embodiment, for example, may be realized without departing from the scope and spirit of the claimed disclosure. For example, the outer electrodes may be formed on the mounting surface 2*a*, the surfaces 2*c* and 2*d* adjacent to the mounting surface 2*a*, and the upper surface 2*b* of the body; on the mounting surface 2*a*, the surfaces 2*c* and 2*d* adjacent to the mounting surface 2*a*, and the surfaces 2*e* and 2*f* adjacent to the surfaces 2*c* and 2*d* of the body; or on the mounting surface 2*a*, the surfaces 2*c*, 2*d*, 2*e*, and 2*f* adjacent to the mounting surface 2*a*, and the upper surface 2*b* of the body.

The outer electrodes may instead be formed by exposing the metal magnetic powder contained in the body in regions where the outer electrodes are to be formed on the body and forming an underlayer, a first layer, and a second layer in the regions where the metal magnetic powder is exposed. The underlayer is made of copper and formed by plating on the wide surfaces of the lead-out portions. The first layer is made of nickel and formed on the underlayer. The second layer is made of tin and formed on the first layer. In this case, copper contained in the outer electrodes and having high affinity with copper contained in the conductive wire can be joined with the end portions of the coil. Therefore, the end portions of the coil serve to increase the connection reliability between the body and the outer electrodes.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:

a body that is rectangular parallelepiped-shaped and that includes a magnetic portion containing magnetic powder and a coil embedded in the magnetic portion; and a pair of outer electrodes provided on the body and connected to the coil, wherein the coil includes a wound portion configured by a conductive wire wound in an upper layer and a lower layer, the conductive wire having a pair of wide surfaces that are opposite to each other, and a pair of lead-out portions, one of which extends from one end portion of the wound portion located at an outermost periphery of the upper layer and an other of which extends from an other end portion of the wound portion located at an outermost periphery of the lower layer, wherein the pair of lead-out portions include a first lead-out portion and a second lead-out portion, one wide surface of a distal end portion of the first lead-out portion is exposed at a mounting surface of the body, a first surface of the body that is adjacent to the mounting surface, and a corner portion between the mounting surface and the first surface, one wide surface of a distal end portion of the second lead-out portion is exposed at the mounting surface of the body, a second surface of the body that is different from the first surface of the body and adjacent to the mounting surface, and a corner portion between the mounting surface and the second surface, one of the pair of outer electrodes covers the wide surface of the first lead-out portion that are exposed at the surfaces of the body, an other of the pair of outer electrodes covers the wide surface of the second lead-out portion that are exposed at the surfaces of the body, the pair of wide surfaces of the conductive wire each comprise an inner wide surface facing toward a winding axis and an outer wide surface facing away from the winding axis, each lead-out portion includes a twisted portion between a corresponding one of the end portions of the wound portion and the distal end portion of the lead-out portion, the inner wide surfaces of a wound-portion-side end portion of the twisted portion are parallel to the winding axis, and the inner wide surfaces of a distal-side end portion of the twisted portion are twisted towards the mounting surface.

2. The inductor according to claim 1, wherein the body that is rectangular parallelepiped-shaped has a short-side direction and a long-side direction, the wound portion is disposed such that the winding axis thereof crosses the mounting surface of the body, the end portions of the wound portion are disposed on or near a plane extending in the short-side direction of the body and including the winding axis of the wound portion, and when the body is viewed from the mounting surface, an angle among angles is defined by a straight line connecting the wound-portion-side end portion of the twisted portion and the distal-side end portion of the twisted portion, and the plane extending in the short-side direction of the body and including the winding axis of the wound portion, the angle that is adjacent to the winding axis of the wound portion is an acute angle.

3. The inductor according to claim 1, wherein the second surface of the body faces the first surface of the body.

* * * * *